United States Patent
Liu et al.

(10) Patent No.: US 12,417,129 B2
(45) Date of Patent: Sep. 16, 2025

(54) METHODS, TERMINALS AND NETWORK DEVICES FOR COMPUTING TASK ALLOCATION AND UPDATING

(71) Applicant: ZHEJIANG LAB, Hangzhou (CN)

(72) Inventors: Mengmeng Liu, Hangzhou (CN); Qiongqian Yang, Hangzhou (CN); Dandan Huang, Hangzhou (CN); Chen Xu, Hangzhou (CN); Yanlin Liu, Hangzhou (CN); Zhenting Li, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 523 days.

(21) Appl. No.: 18/095,381

(22) Filed: Jan. 10, 2023

(65) Prior Publication Data
US 2023/0376355 A1 Nov. 23, 2023

Related U.S. Application Data (63) Continuation of application No. PCT/CN2022/120927, filed on Sep. 23, 2022.

(30) Foreign Application Priority Data

May 17, 2022 (CN) .......................... 202210531725.8

(51) Int. Cl.
*G06F 9/46* (2006.01)
*G06F 9/50* (2006.01)

(52) U.S. Cl.
CPC .................................. *G06F 9/5055* (2013.01)

(58) Field of Classification Search
None
See application file for complete search history.

(56) References Cited

U.S. PATENT DOCUMENTS 12,124,884 B2 * 10/2024 Sahasranamam ..... G06F 9/5094

FOREIGN PATENT DOCUMENTS

| CN | 112004239 A | 11/2020 |
| CN | 112272239 A | 1/2021 |
| CN | 112996056 A | 6/2021 |
| CN | 113783944 A | 12/2021 |

(Continued)

OTHER PUBLICATIONS

Nagargadde et al; Hybrid P2P Based Self Organising Grids for Efficient Resource Distribution; IEEE 2005 (Year: 2005).*

(Continued)

*Primary Examiner* — Bing Zhao
(74) *Attorney, Agent, or Firm* — IPro, PLLC (57) ABSTRACT

The disclosure discloses a computing task allocation method, an updating method for computing task allocation, a terminal and a network device. When a computing task of a terminal is generated, computing task allocation is performed using at least one of a centralized mode, a distributed mode, or a hybrid mode; the computing task allocation includes communication resource allocation, computing resource allocation, and a task offloading decision; the above computing task allocation method subjected to dynamically updating according to a terminal state, a network state or a task state. Therefore, the compromise problem between overall system performance optimization and device fairness in a cloud-edge collaborative IoT system is solved.

18 Claims, 3 Drawing Sheets

(56) References Cited

FOREIGN PATENT DOCUMENTS

| | | |
|---|---|---|
| CN | 113873022 A | 12/2021 |
| CN | 113965961 A | 1/2022 |
| CN | 114637608 A | 6/2022 |

OTHER PUBLICATIONS

Liu et al; Real-time Task Offloading for Data and Computation Intensive Services in Vehicular Fog Computing Environments; IEEE 2020 (Year: 2020).*
National Intellectual Property Administration of Peoples Republic China, The First Office Action issued on Jul. 5, 2022 in Chinese Patent Application No. 202210531725.8, 25 pages with translation.
International Search Report, International Patent Application No. PCT/CN2022/120927, dated Dec. 1, 2022.

* cited by examiner

METHODS, TERMINALS AND NETWORK DEVICES FOR COMPUTING TASK ALLOCATION AND UPDATING

CROSS REFERENCE TO RELATED APPLICATIONS

The present disclosure claims priority to Chinese Patent Application No. 202210531725.8, entitled "Methods, Terminals and Network Devices for Computing Task Allocation and Updating" and filed with China National Intellectual Property Administration on May 17, 2022, the entire content of which is incorporated herein by reference.

TECHNICAL FIELD

The present disclosure relates to the technical field of cloud-edge collaborative Internet-of-Things (IoT) system, in particular to methods, terminals and network devices for computing task allocation and updating.

BACKGROUND

With the rapid development of technology, the number of IoT devices has increased dramatically. Due to the limited computing power of the IoT devices, the problem of insufficient computing power may be present when computation-intensive and time-sensitive applications are processed. To address this problem, computing tasks generated by the IoT devices may be offloaded to cloud or network edge nodes, and data is processed and analyzed using cloud servers or edge servers. Offloading the computing tasks generated by a large number of IoT devices to the cloud or edge nodes may result in network congestion and increase the latency of tasks, and has difficulty in meeting Quality of Service (QoS) requirements for time-sensitive tasks.

For centralized computing task offloading decisions in the prior art, task allocation and resource scheduling are performed by the cloud or edge servers, which generally focuses only on improving the performance of the overall system, but neglects the fairness problem of the IoT devices.

Researchers of the present disclosure have found that the tasks generated by a large number of IoT devices have varied types and different features, and the cost of computing resources that can be borne by the different IoT devices varies.

SUMMARY

An objective of the present disclosure is to provide a method for computing task allocation, an updating method for computing task allocation, a terminal and a network device thereof, to solve the compromise problem between overall system performance optimization and device fairness in a cloud-edge collaborative IoT system.

To achieve the above objective, the present disclosure provides technical solutions as follows.

The present disclosure discloses a computing task allocation method, specifically including the following operations: performing computing task allocation using at least one of a centralized mode, a distributed mode or a hybrid mode; the computing task allocation comprising a communication resource allocation, a computing resource allocation, and a task offloading decision;

when the computing task allocation is performed using the centralized mode, performing the computing task allocation by a network device, and issuing an allocation result to a terminal in whole or in part;

when the computing task allocation is performed using the distributed mode, performing the computing task allocation locally by the terminal, and uploading an allocation result to the network device in whole or in part;

when the computing task allocation is performed using the hybrid mode, performing the computing task allocation locally by the terminal according to an instruction of the network device, and uploading a terminal-specific allocation result to the network device in whole or in part.

Preferably, performing the computing task allocation by the network device specifically includes the following operations: performing communication resource allocation and computing resource allocation and making a task offloading decision by the network device according to features of computing tasks, terminal energy consumption, terminal computing power reported by respective terminals, and computing power of the network device, and network topology.

Preferably, performing the computing task allocation locally by the terminal specifically comprises the following operations: performing communication resource allocation, and making a task offloading decision by the terminal according to the features of the computing tasks, unit price of computing resources, terminal energy consumption, terminal storage capacity and expected transmission latency.

Preferably, the task offloading decision includes one of the following two solutions:
A. whether a computing task is offloaded; if the computing task is offloaded, obtaining an identity of a target computing server;
B. determining a maximum number of tasks that can be offloaded or determining a maximum amount of computation of tasks that can be offloaded;

Preferably, the solution A also includes obtaining an offloading path if the computing task is offloaded.

Preferably, the task offloading decision is made taking into account one or more of the following factors:
a. features of a computing task, including: task load, amount of computation required by the task, task type, maximum tolerance latency of the task, and priority of the task;
b. computing power, including all computing-capable devices in the network;
c. unit price of computing resources;
d. terminal storage capacity;
e. terminal energy consumption;
f. expected transmission latency, including: transmission latency for a task to be uploaded to the network device, transmission latency for a computation result to be returned to the terminal, and relay latency; and
g. network topology.

Preferably, the communication resource allocation includes communication resources required to transmit the computing tasks to the target computing server.

Preferably, the communication resource allocation further includes communication resources required for receiving a computation result.

The present disclosure also discloses an updating method for computing task allocation, including: performing dynamic updating on the above computing task allocation method according to a terminal state, a network state or a task state.

Preferably, the terminal state includes mobility, location and an energy consumption state; the network state includes a change in network topology, a network congestion condition, release and occupancy situations of computing resources in a network; and the task state includes a task queue state, a change trend of task types.

Preferably, the dynamic updating is periodic updating or aperiodic updating, and the aperiodic updating is either event-based updating or triggering-based updating.

The present disclosure also discloses a terminal configured to implement the following operations:
  when computing task allocation is performed using a centralized mode, reporting features of a computing task, terminal energy consumption and terminal computing power to a network device, and receiving an allocation result issued by the network device;
  when computing task allocation is performed using a distributed mode, performing the computing task allocation locally according to the features of the computing task, unit price of computing resources, terminal energy consumption, and expected transmission latency; and uploading an allocation result to the network device in whole or in part;
  when computing task allocation is performed using a hybrid mode, performing the computing task allocation locally according to an instruction of the network device, and uploading a terminal-specific allocation result to the network device in whole or in part;
  determining whether to locally compute or to offload each computing task or subtask generated according to a task offloading decision; if the computing task is offloaded, determining a transmission path of the task and transmitting the task to a target computing server on the allocated communication resource; and
  receiving a computation result for the task.

The present disclosure further discloses a network device that is configured to implement the following operations:
  when computing task allocation is performed using a centralized mode, performing the computing task allocation according to features of a computing task, terminal computing power reported by a terminal, computing power of the network device and a network topology factor, and issuing an allocation result to the terminal in whole or in part;
  when computing task allocation is performed using a distributed mode, receiving the allocation result uploaded by the terminal;
  when computing task allocation is performed using a hybrid mode, transmitting an instruction of the computing task allocation to the terminal, and receiving a terminal-specific allocation result uploaded by the terminal Advantageous effects of the present disclosure:
1. reducing latency of the tasks and energy consumption of task offloading;
2. reducing the amount of data transmitted by the network, and reducing network congestion; and
3. improving fairness of terminal devices.

The features and advantages of the present disclosure will be described in detail by way of examples and drawings.

DETAILED DESCRIPTION

In order to make the objectives, technical solutions and advantages of the present disclosure clearer, the present disclosure will be further described in detail by way of embodiments and drawings. However, it should be understood that the specific embodiments described herein are merely used to explain the present disclosure, but are not intended to limit the scope of the present disclosure. In addition, in the following description, descriptions of well-known structures and techniques are omitted to avoid unnecessarily obscuring the concept of the present disclosure.

Embodiment

Figure 1:
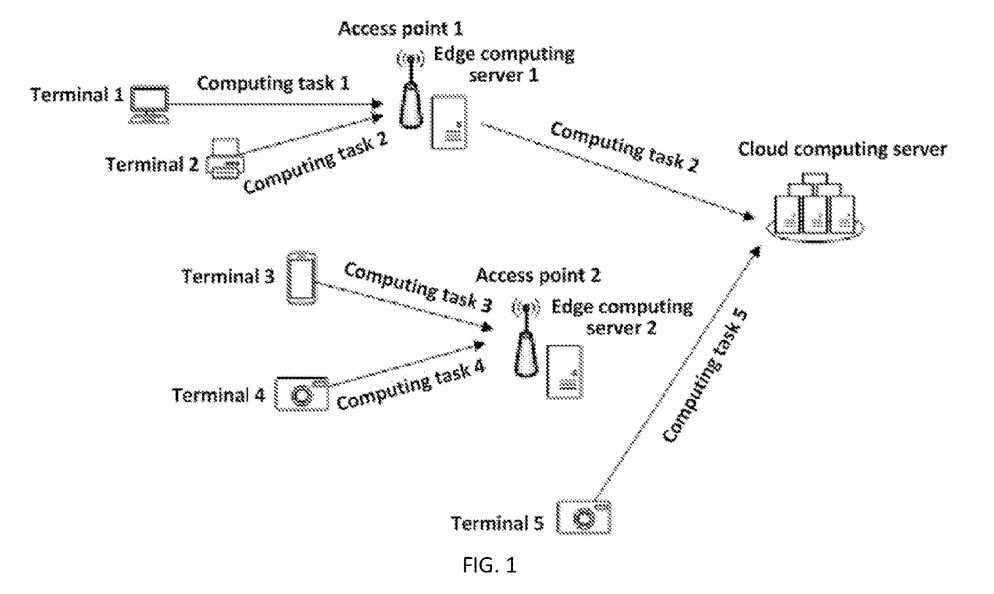
FIG. 1 is a schematic diagram of the architecture of a cloud-edge collaborative IoT system.

Referring to FIG. 1, FIG. 1 is a schematic diagram of the architecture of a cloud-edge collaborative IoT system. To improve computing efficiency, computing tasks generated by IoT terminals may be offloaded onto an edge computing server, or further onto a cloud computing server, thereby achieving cloud-edge-end collaborative intelligent computation. In FIG. 1, terminals may transmit computing tasks via access points (e.g., cellular radio base stations) to a computing server connected to the access points, wherein a computing task 1 generated by a terminal 1 is offloaded to an edge computing server 1; a computing task 2 generated by a terminal 2 is offloaded to an edge computing server 2 and further offloaded to a cloud computing server; a computing task 3 generated by a terminal 3, and a computing task 4 generated by a terminal 4 are offloaded to the edge computing server 2; and a computing task 5 generated by a terminal 5 is offloaded to the cloud computing server.

Figure 2:
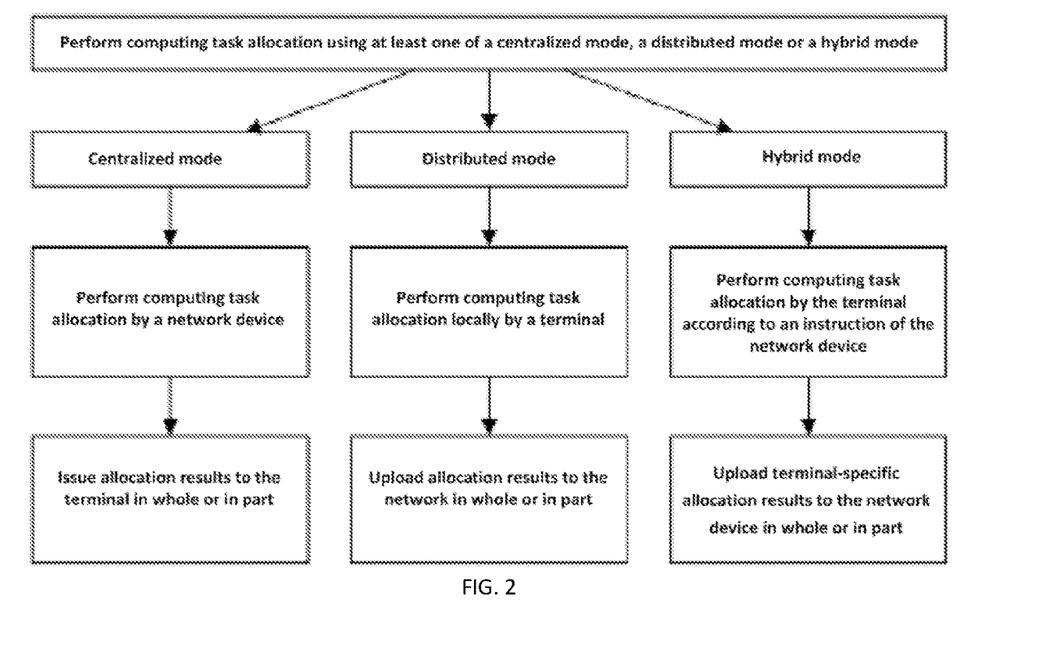
FIG. 2 is a flow chart of implementation of a computing task allocation method.

Referring to FIG. 2, FIG. 2 is a flow chart of implementation of a computing task allocation method. When a computing task of an IoT terminal is generated, computing task allocation may be performed using at least one of a centralized mode, a distributed mode, or a hybrid mode. When the centralized mode is used, the computing task allocation is performed by a network device (e.g., an edge/cloud server), and an allocation result is issued to the IoT terminal in whole or in part. When the distributed mode is used, the computing task allocation is performed locally by the terminal, and optionally, an allocation result is transmitted to the network device in whole or in part. When the hybrid mode is used, the computing task allocation is performed locally by the terminal according to an instruction of the network device, and a terminal-specific allocation result is uploaded to the network device in whole or in part.

Computing task allocation includes communication resource allocation, computing resource allocation, task offloading decision.

The communication resource allocation includes: code domain resource allocation, e.g., a precoding codebook, a sparse code multiple access (SCMA) codebook; time domain resource allocation, e.g., a slot or a set of symbols in a slot; frequency domain resource allocation, e.g., resource pool, resource block (RB), or subcarrier; and power domain resource allocation.

The communication resource allocation includes the communication resources required to transmit the computing task to the target computing server, and may also include communication resources required to receive the computation result by the IoT terminal.

The task offloading decision includes any one of:

A. whether a computing task (or subtask) is offloaded (mandatory); an identity of the target computing server if the computing task is offloaded (i.e., to which edge server or cloud server to offload, mandatory); an offload path (i.e., a path from the terminal to the target computing server, optional).

B. a maximum number of tasks (or subtasks) that can be offloaded or a maximum amount of computation of tasks that can be offloaded.

The task offloading decision is made taking into account one or more of the following factors:

a. features of a computing task/subtask, including:
  task load (unit: bit),
  amount of computation required by the task (maximum number of CPU cycles),
  task type, including: transmission resource-intensive type, computing resource-intensive type, performance-sensitive type, latency-sensitive type, etc.,
  maximum tolerance latency of the task, and
  priority of the task, including: transmission priority and computation priority;
b. computing power (the number of CPU cycles per second), including the computing power of all computing-capable devices in a cloud-edge collaborative IoT system, e.g., IoT devices, edge/cloud servers, etc.;
c. unit price of computing resources, wherein the price unit may be data size/length (e.g., Mbits, MBytes), or unit time (e.g., per second, per minute); the pricing scheme may be flat pricing, or differential pricing; and the flat pricing means that all IoT devices (or users) use the same unit price, and the differential pricing means that each user uses a different unit price;
d. terminal storage capacity;
e. terminal energy consumption; and
f. expected transmission latency, including: transmission latency for a task (subtask) to be uploaded to the network device, transmission latency for a computation result to be returned to an IoT device, and relay latency; wherein if the transmission path involves relay transmissions from multiple nodes, relay latency of each node in the transmission path needs also to be taken into account, for example, if a relay node employs a decode-and-forward approach, the relay latency includes decode latency and forward latency; and transmission latency is related to data size/length, transmission path length, radio channel state, radio signal encoding and decoding mode, etc.; and
g. network topology, i.e., distances and connection relationships between individual nodes.

In centralized computing task allocation, the network device performs computing task allocation including communication resource allocation and computing resource allocation, and makes task offloading decision according to the features of computing tasks (or subtasks), terminal energy consumption, terminal computing power reported by respective IoT terminals, computing power of the network device, network topology, and other factors. See FIG. 3.

Figure 3:
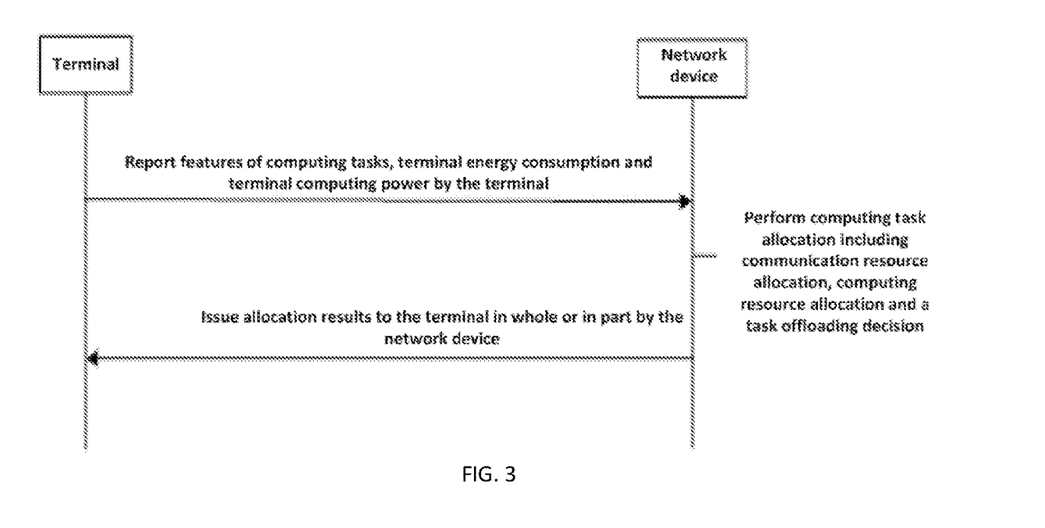
FIG. 3 is a flow chart of a computing task allocation method in a centralized mode.

For centralized computing task allocation, a message of the computing task allocation result issued by the network device to the terminal may be common, and transmitted through a base station broadcast message, may also be terminal-specific, and transmitted through a base station unicast message. The task offloading decision employs the first solution (A, whether the computing task is offloaded; an identity of the target computing server if the computing task is offloaded). For example, when whether a computing task $t_i$ of the IoT device $d_i$ can be offloaded is indicated, 0 is used to indicate that offloading is allowable, and 1 is used to indicate that offloading is unallowable; if offloading is allowable, the computing task is allowed to be offloaded to a cloud server with an identity '000xFF', and also it is indicated that an offloading path is $d_i \rightarrow R_i \rightarrow S_i$, indicating that the IoT device $d_i$ uploads the computing task to a server $S_i$ via a relay node $R_i$.

In distributed computing task allocation, the terminal performs communication resource allocation and makes a task offloading decision according to features of computing tasks (or subtasks), unit price of computing resources, terminal energy consumption, terminal storage capacity, expected transmission latency and other factors. Optionally, the terminal transmits an allocation result to the network device in whole or in part to assist the network device in making the task decision. For example, the terminal locally makes the communication resource allocation and the task offloading decision and only transmits the task offloading decision to the network device.

In hybrid computing task allocation, the terminal performs computing task allocation locally according to the instruction of the network device, for example, each IoT terminal makes a respective task offloading decision according to the task offloading decision issued by the cloud computing server. Optionally, the terminal transmits a terminal-specific allocation result to the network device in whole or in part to assist the network device in performing the instruction.

For distributed and hybrid computing task allocation, optionally, the terminal transmits a local task allocation result (e.g., communication resource allocation, task offloading decision) in whole or in part to the network device (e.g., a radio access network node, an edge computing server), helping the network device to grasp the computing resource distribution state throughout the entire system.

For hybrid computing task allocation, an instruction message of computing task allocation transmitted by the network device to the terminal is common, is transmitted through a base station broadcast message, and is common to a plurality of terminals. The task offloading decision employs the second solution (B, determining the maximum number of tasks that can be offloaded or determining the maximum amount of computation of tasks that can be offloaded). That is, a maximum number of tasks (or subtasks) that can be offloaded, or the maximum amount of computation of tasks that can be offloaded is specified, instead of specifying whether a certain computing task can be offloaded; and the IoT device is used to determine the task or tasks to be offloaded.

The task types generated by a large number of IoT devices are diverse, and may be divided into, for example, transmission-intensive tasks, computing-intensive tasks, performance-sensitive tasks, time-sensitive tasks, or the like. The transmission-intensive tasks require a large amount of data to participate in computing, but have little consumption of computing resources, and primarily have communication resource consumption and energy consumption for data transmission, so that such tasks are suitable for local computing or nearby offloading, so as to save communication resource consumption and energy consumption for long-range transmission, thereby improving user experience. The computing-intensive tasks require a small amount of data but require a large amount of computing resources, so that such tasks are suitable for being offloaded to a cloud server with powerful computing capacity, such as face recognition. The performance-sensitive tasks have high requirements on performance indicators, but low requirements on latency, and thus are suitable for being offloaded to the cloud server with powerful computing capacity, such as product defect detection. The time-sensitive tasks have high latency requirements and are suitable for local computing or nearby offloading, such as multiplayer real-time online games. It should be noted that the same computing task may be of multiple types at the same time, for example, not only requires a large amount of communication resources to achieve low latency, high reliable transmission performance, and also requires a large amount of computing resources to accomplish a high-quality computing task. For multi-type computing tasks, multiple different dimensions of priority can be set, such as computing priority and communication priority, to achieve better compromise between overall system performance and IoT device fairness.

An embodiment of the present disclosure discloses an updating method for computing task allocation, including dynamically updating a computing task allocation method according to a terminal state, a network state, or a task state.

The terminal state includes mobility, location, and an energy consumption state.

For example, the terminal moves to a new cell. Assuming that each base station has a respective edge computing server, after a terminal (or referred to as an IoT device, or referred to as a user) moves to a new cell, the terminal is within coverage of the new cell, and establishes a connection with the base station of the new cell, and then the computing task of the IoT device needs to be migrated to a new target computing server).

For example, a great change in the location of the terminal may result in great transmission latency due to a long distance of a user from a computing server, thus not being suitable for offloading resource-intensive tasks.

For example, a battery of the terminal is replaced. If local computing of the IoT device occupies too high energy consumption (e.g., above a preset threshold), and the electric quantity is low, the computing task offloading is selected; and if the local computing capability is improved after battery replacement, local computing is selected.

The network state includes a change in network topology, a network congestion condition, release and occupancy situations of computing resources in the network.

The task state includes a task queue (or workflow) state, a change trend of task types.

The task queue state: for example, task processing speed, task arrival rate.

The change trend of task types: for example, if the predicted task type changes from the transmission resource-intensive type to the computing resource-intensive type, there are more tasks that need to be offloaded to the computing server.

The computing task allocation may be subjected to periodic updating or aperiodic updating.

Periodic updating: for example, a period is preset, wherein centralized computing task allocation is updated once every 1 minute, distributed computing task allocation is updated once every 30 minutes.

Aperiodic updating: event-based updating is performed, for example, when the terminal moves to a new cell; triggering-based updating is performed, for example, when the unit price of the computing resources exceeds a preset threshold, or the electric quantity of the terminal falls below a preset percentage.

The computing task allocation may be updated in a given computing task allocation mode (i.e., the centralized mode, the distributed mode or the hybrid mode) or between different computing task allocation modes, for example, the centralized mode is changed into the distributed mode, and the distributed mode is changed into the hybrid mode.

In a specific embodiment, different terminals in the system employ different computing task allocation modes, for example, some terminals employ the centralized mode, some other terminals employ the hybrid mode, and still some terminals employ the distributed mode.

In a specific embodiment, a task may be split into a plurality of subtasks to be offloaded or distributed, wherein different subtasks may be computed at different computing locations, and parallel execution of the offloaded tasks may be executed by local computing, or cloud-side-end collaborative computing, thereby increasing the flexibility of the computing task.

Priorities may be set for the tasks or subtasks, including for transmission priorities (Pri_t), and/or computing priorities (Pri_c). If the IoT device has a plurality of computing tasks that need to be offloaded to the computing server, tasks with Pri_t are transmitted preferentially; if the computing server receives the plurality of computing tasks, the computing server computes tasks with high Pri_c preferentially; and tasks with the same computing priority are computed according to the order of arrival time.

An embodiment of the present disclosure discloses a terminal. When a centralized computing task allocation method is used, features of a computing task (or subtask), terminal energy consumption, and terminal computing power are reported to a network device, and an allocation result issued by the network device is received;

When a distributed computing task allocation method is used, computing task allocation is performed locally according to the features of the computing task, unit price of computing resources, terminal energy consumption, expected transmission latency and other factors, and an allocation result is uploaded to the network device in whole or in part;

When a hybrid computing task allocation method is used, computing task allocation is performed locally according to an instruction of the network device, and a terminal-specific allocation result is uploaded to the network device in whole or in part; and optionally, the features of the computing task (or subtask) and the energy consumption are reported to the network device.

According to a task offloading decision, whether to locally compute or to offload each computing task or subtask generated is determined. See step S1 in FIG. 4.

Figure 4:
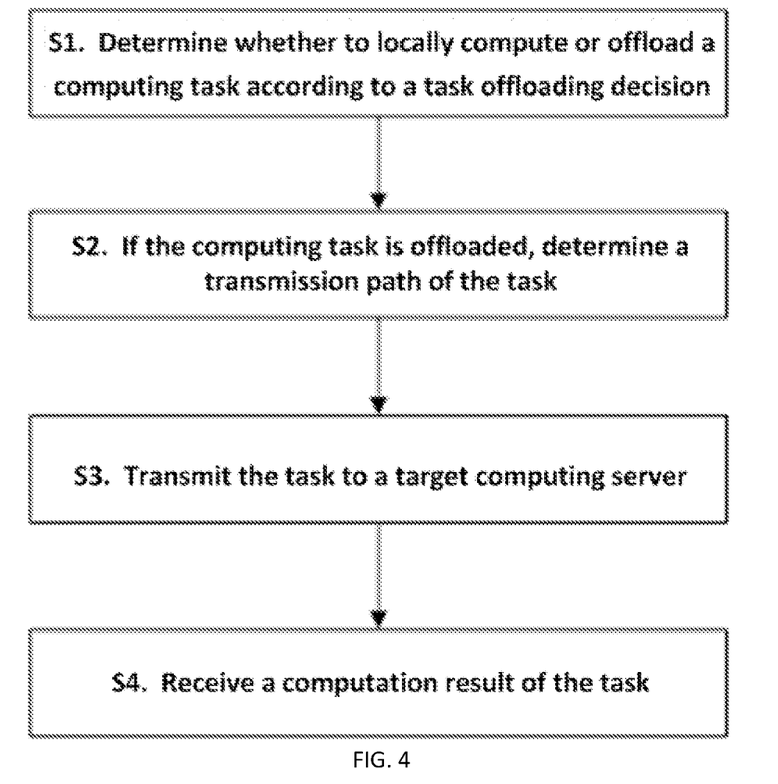
FIG. 4 shows a terminal.

If the task is offloaded, a transmission path of the task is determined according to communication resource allocation and the task offloading decision, see step S2 in FIG. 4; on the allocated communication resource, the task is transmitted to the target computing server, see step S3 in FIG. 4.

A computation result of the task is received, see step S4 in FIG. 4.

An embodiment of the present disclosure discloses a network device. When a centralized computing task allocation method is employed, computing task allocation is performed according to features of computing tasks (or subtasks), terminal energy consumption, terminal computing power reported by the terminals (i.e., respective IoT devices), and computing power of the network device, and network topology, and allocation results are issued to the terminals in whole or in part;

When computing task allocation is performed using a distributed mode, allocation results uploaded by the terminals are received; and when computing task allocation is performed using a hybrid mode, an instruction of computing task allocation is transmitted to the terminal, and terminal-specific allocation results uploaded by the terminals are received.

The network device may be common edge/cloud infrastructure, such as a cloud server or an edge server; an intelligent computing center; a radio access network (RAN) node, such as a base station (BS); WiFi access point (AP); an unmanned aerial vehicle (UAV), or a high altitude platform station (HAPS) carried with a cloud server or an edge server; and a satellite, and the like.

An embodiment of the present disclosure discloses an apparatus to implement the above method, which may be applied in terminals or network devices. The apparatus comprises the following modules:

a computing task allocation module, which is used for computing task allocation, comprising a communication resource allocation sub-module, a computing resource allocation sub-module and a task offloading decision sub-module;

a task transmitted module, which is used for transmitting tasks to a target computing server;

a task implemented module, which is used for implementing computation tasks.

The above are only the preferred embodiments of the present disclosure and are not intended to limit the present disclosure, and any modifications, equivalents or improvements within the spirit and principle of the present disclosure are intended to be included within the scope of the present disclosure.

What is claimed is:

1. A terminal, wherein the terminal is configured to implement the following operations:

generating a computing task for execution;

when computing task allocation is performed, by a network device, using a centralized mode, reporting features of the computing task and terminal energy consumption to the network device, and receiving an allocation result of the computing task allocation issued by the network device; wherein the features of the computing task comprising task load, amount of computation required by the computing task, task type, maximum tolerance latency of the task, and priority of the computing task;

when computing task allocation is performed using a distributed mode, performing the computing task allocation locally, to the terminal, according to the features of the computing task, unit price of computing resources, terminal energy consumption, and expected transmission latency; and uploading an allocation result of the computing task allocation to the network device in whole or in part to assist the network device in making a task allocation decision for one or more other computing tasks;

when computing task allocation is performed using a hybrid mode, performing the computing task allocation locally, to the terminal, according to an instruction, issued to a plurality of terminals including the terminal, from the network device, and uploading an allocation result, that is specific to the terminal, of the computing task allocation to the network device in whole or in part to assist the network device in performing the instruction;

the computing task allocation comprises a communication resource allocation, a computing resource allocation, and a task offloading decision;

determining whether to locally, to the terminal, compute or to offload the computing task according to task offloading decision; and when the computing task is determined to be offloaded, determining a transmission path of the task and transmitting the task to a target computing server on the allocated communication resource;

receiving a computation result for the computing task;

transmitting a task allocation result to the network device in whole or in part, helping the network device to grasp the computing resource distribution state of an entire system; and the instruction of the network device specifically comprising a task offloading decision comprising determining a maximum number of tasks that can be offloaded or determining a maximum amount of computation of tasks that can be offloaded.

2. The terminal according to claim 1, wherein the computing task allocation performed by the network device specifically comprises the following operations: performing communication resource allocation and computing resource allocation, and making a task offloading decision by the network device according to features of computing tasks, terminal energy consumption, terminal computing power reported by respective terminals, computing power of the network device, and network topology.

3. The terminal according to claim 1, wherein the computing task allocation locally performed by the terminal specifically comprises the following operations: performing communication resource allocation, and making a task offloading decision by the terminal according to features of the computing tasks, unit price of computing resources, terminal energy consumption, terminal storage capacity and expected transmission latency.

4. The terminal according to claim 1, wherein the task offloading decision is made taking into account one or more of the following factors:

features of a computing task, comprising: task load, amount of computation required by the task, task type, maximum tolerance latency of the task, and priority of the task;

computing power, comprising computing-capable devices in the network;

unit price of computing resources;

terminal storage capacity;

terminal energy consumption;

expected transmission latency, comprising: transmission latency for a task to be uploaded to the network device, transmission latency for a computation result to be returned to the terminal, and relay latency; and network topology.

5. The terminal according to claim 1, wherein the communication resource allocation comprises communication resources required to transmit the computing task to the target computing server.

6. The terminal according to claim 5, wherein the communication resource allocation further comprises communication resources required for receiving a computation result.

7. The terminal according to claim 1, wherein the terminal is further configured to implement the following operations: performing dynamic updating on the computing task allocation according to a terminal state, a network state or a task state in one of a distributed mode or a hybrid mode, or between the distributed mode or the hybrid mode.

8. The terminal according to claim 7, wherein the terminal state comprises mobility, location and an energy consumption state; the network state comprises a change in network topology, a network congestion situation, release and occupancy situations of computing resources in a network; and the task state comprises a task queue state, a change trend of task types.

9. The terminal according to claim 7, wherein the dynamic updating is periodic updating or aperiodic updating, and the aperiodic updating comprises event-based updating or triggering-based updating.

10. A terminal, wherein the terminal is configured to implement the following operations:
- generating a computing task for execution;
- when computing task allocation is performed, by a network device, using a centralized mode, reporting features of the computing task and terminal energy consumption to the network device, and receiving an allocation result of the computing task allocation issued by the network device; wherein the features of the computing task comprising task load, amount of computation required by the computing task, task type, maximum tolerance latency of the task, and priority of the computing task;
- when computing task allocation is performed using a distributed mode, performing the computing task allocation locally, to the terminal, according to the features of the computing task, unit price of computing resources, terminal energy consumption, and expected transmission latency; and uploading an allocation result of the computing task allocation to the network device in whole or in part to assist the network device in making a task allocation decision for one or more other computing tasks;
- when computing task allocation is performed using a hybrid mode, performing the computing task allocation locally, to the terminal, according to an instruction, issued to a plurality of terminals including the terminal, from the network device, and uploading an allocation result, that is specific to the terminal, of the computing task allocation to the network device in whole or in part to assist the network device in performing the instruction;
- the computing task allocation comprises a communication resource allocation, a computing resource allocation, and a task offloading decision;
- determining whether to locally, to the terminal, compute or to offload the computing task according to different solutions for the task offloading decision; and when the computing task is determined to be offloaded, determining a transmission path of the task and transmitting the task to a target computing server using the allocated communication resource;
- receiving a computation result for the computing task;
- transmitting a task allocation result to the network device in whole or in part, helping the network device to grasp the computing resource distribution state of an entire system; and
- the instruction of the network device specifically comprising a hybrid mode specific solution for the task offloading decision.

11. The terminal according to claim 10, wherein the computing task allocation performed by the network device specifically comprises the following operations: performing communication resource allocation and computing resource allocation, and making a task offloading decision by the network device according to features of computing tasks, terminal energy consumption, terminal computing power reported by respective terminals, computing power of the network device, and network topology.

12. The terminal according to claim 10, wherein the computing task allocation locally performed by the terminal specifically comprises the following operations: performing communication resource allocation, and making a task offloading decision by the terminal according to features of the computing tasks, unit price of computing resources, terminal energy consumption, terminal storage capacity and expected transmission latency.

13. The terminal according to claim 10, wherein the task offloading decision is made taking into account one or more of the following factors:
- features of a computing task, comprising: task load, amount of computation required by the task, task type, maximum tolerance latency of the task, and priority of the task;
- computing power, comprising computing-capable devices in the network;
- unit price of computing resources;
- terminal storage capacity;
- terminal energy consumption;
- expected transmission latency, comprising: transmission latency for a task to be uploaded to the network device, transmission latency for a computation result to be returned to the terminal, and relay latency; and
- network topology.

14. The terminal according to claim 10, wherein the communication resource allocation comprises communication resources required to transmit the computing task to the target computing server.

15. The terminal according to claim 14, wherein the communication resource allocation further comprises communication resources required for receiving a computation result.

16. The terminal according to claim 10, wherein the terminal is further configured to implement the following operations: performing dynamic updating on the computing task allocation according to a terminal state, a network state or a task state in one of a distributed mode or a hybrid mode, or between the distributed mode or the hybrid mode.

17. The terminal according to claim 16, wherein the terminal state comprises mobility, location and an energy consumption state; the network state comprises a change in network topology, a network congestion situation, release and occupancy situations of computing resources in a network; and the task state comprises a task queue state, a change trend of task types.

18. The terminal according to claim 16, wherein the dynamic updating is periodic updating or aperiodic updating, and the aperiodic updating comprises event-based updating or triggering-based updating.

* * * * *